Figure 1:
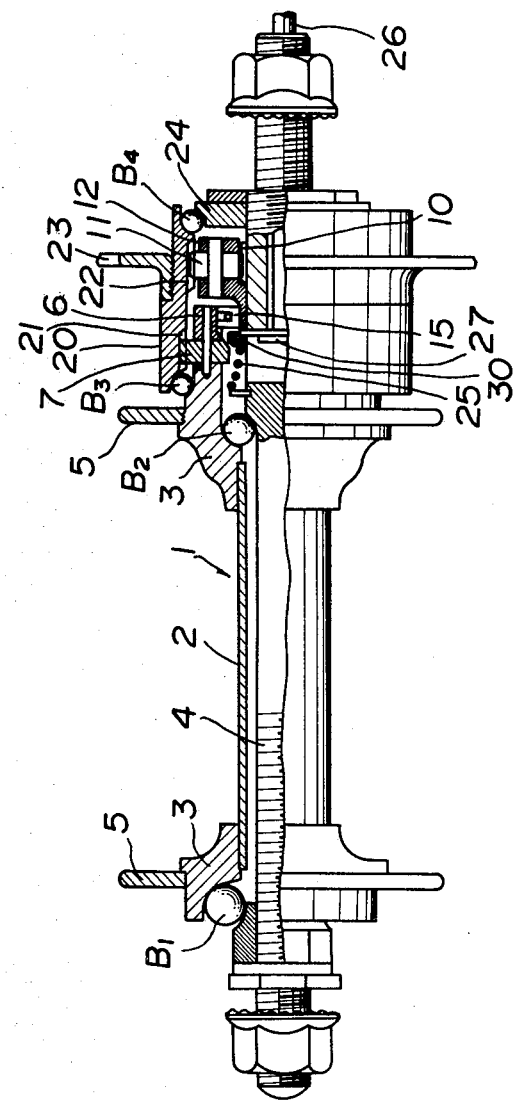

United States Patent [19]

Fukui

[11] 4,294,138
[45] Oct. 13, 1981

[54] TWO STAGE TRANSMISSION HUB FOR A BICYCLE

[75] Inventor: Seiji Fukui, Sakai, Japan

[73] Assignee: Shimano Industrial Company, Limited, Osaka, Japan

[21] Appl. No.: 58,735

[22] Filed: Jul. 19, 1979

[30] Foreign Application Priority Data

Jul. 21, 1978 [JP] Japan .......................... 53-101296[U]
Jan. 30, 1979 [JP] Japan ............................ 54-1125[U]

[51] Int. Cl.³ .......................... F16H 3/44; F16D 41/02
[52] U.S. Cl. ................................ 74/750 B; 74/781 B; 192/47
[58] Field of Search ................... 74/366, 368, 752 C, 74/750 B, 781 B, 217 B; 192/6 A, 47

[56] References Cited

U.S. PATENT DOCUMENTS

| | | | |
|---|---|---|---|
| 2,731,857 | 1/1956 | Marino | 74/750 B X |
| 3,081,641 | 3/1963 | Iseman | 192/6 A X |
| 3,513,725 | 5/1970 | Shimano et al. | 74/752 |
| 3,870,134 | 3/1975 | Anthamatten | 192/6 A |
| 4,059,028 | 11/1977 | Schulz et al. | 74/750 B X |

Primary Examiner—Allan D. Herrmann
Attorney, Agent, or Firm—Stevens, Davis, Miller & Mosher

[57] ABSTRACT

A two stage transmission hub for a bicycle is disclosed in which one of the hub end portions located at both axial ends of a hub body is extended axially outwardly of a hub flange to form a cylindrical extension integrated with the end portion; transmitting pawls are supported to the cylindrical extension; a sun gear is provided at a hub shaft positioned axially outwardly of the cylindrical extension; a gear frame having a planetary pinion in mesh with the sun gear is rotatably supported to the hub shaft and is arranged axially in series to the cylindrical extension; a cylindrical driving member which covers the outer peripheries of the cylindrical extension and gear frame is rotatably supported to the hub shaft and has at an inner periphery ratchet teeth in mesh with the transmitting pawls and inner teeth in mesh with the planetary pinions, and has at the outer periphery at least one sprocket; and a control member is provided to control the transmitting pawls; so that the driving force from the sprocket is speed-changed at two stages and transmitted to the hub body through the cylindrical extension.

4 Claims, 3 Drawing Figures

TWO STAGE TRANSMISSION HUB FOR A BICYCLE

This invention relates to a two stage transmission hub for a bicycle, and more particularly to a two stage transmission hub provided with a hub shaft and a hub body rotatably supported thereto and assembled with a transmission mechanism at one axially outward end of the hub body.

Generally, this kind of hub is, for example, as disclosed in U.S. Pat. No. 3,513,725, assembled with a transmission mechanism separate from the hub body, the transmission mechanism being mounted to the outer periphery of one axial end of the hub body by screw means.

In other words, a screw thread is formed at the outer periphery of one axial end of the hub body and a bearing cone separated therefrom is provided which is screwed with the thread.

The conventional hub constituted as discribed has a driving member larger in diameter to increase the weight of the same. Furthermore, an extra driven cone is required, whereby the number of parts increases and the construction becomes complex.

This invention has been designed to overcome the aforesaid problems. An object of the invention is to provide a two stage transmission hub for a bicycle which is simple in construction due to a small number of parts, light in weight due to a smaller diameter driving member, and which provides a sufficient transmission ratio.

In detail, the hub of the invention is constructed such that one of hub end portions provided at both axial ends of the hub body is extended axially outwardly of a hub flange to form a cylindrical extension integrated with the hub end portion; transmitting pawls are supported to the cylindrical extension; a sun gear is provided at a hub shaft positioned axially outwardly of the cylindrical extension; a gear frame having planetary pinions in mesh with the sun gear is rotatably supported onto the hub shaft and is arranged axially in series to the cylindrical extension; a cylindrical driving member which covers the outer peripheries of the cylindrical extension and gear frame is rotatably supported onto the hub shaft and has at the inner surface ratchet teeth in mesh with the transmitting pawls and inner teeth in mesh with the planetary pinions and has at the outer periphery at least one sprocket; and a control member is supported onto the hub shaft to be axially movable by external control for controlling the engagement and disengagement of the transmitting pawls with the ratchet teeth; so that the driving force from the sprocket may be speedchanged at two stages and transmitted to the hub body by way of the cylindrical extension.

Accordingly, the hub of the invention is made simple in construction due to a small number of parts, and no part except for the planetary pinions is interposed between the sun gear and the inner teeth at the driving member thereby enabling the planetary pinions to each have a larger diameter while the driving member is smaller in diameter making the hub light in weight, while providing a sufficient transmission ratio.

Figure 2:
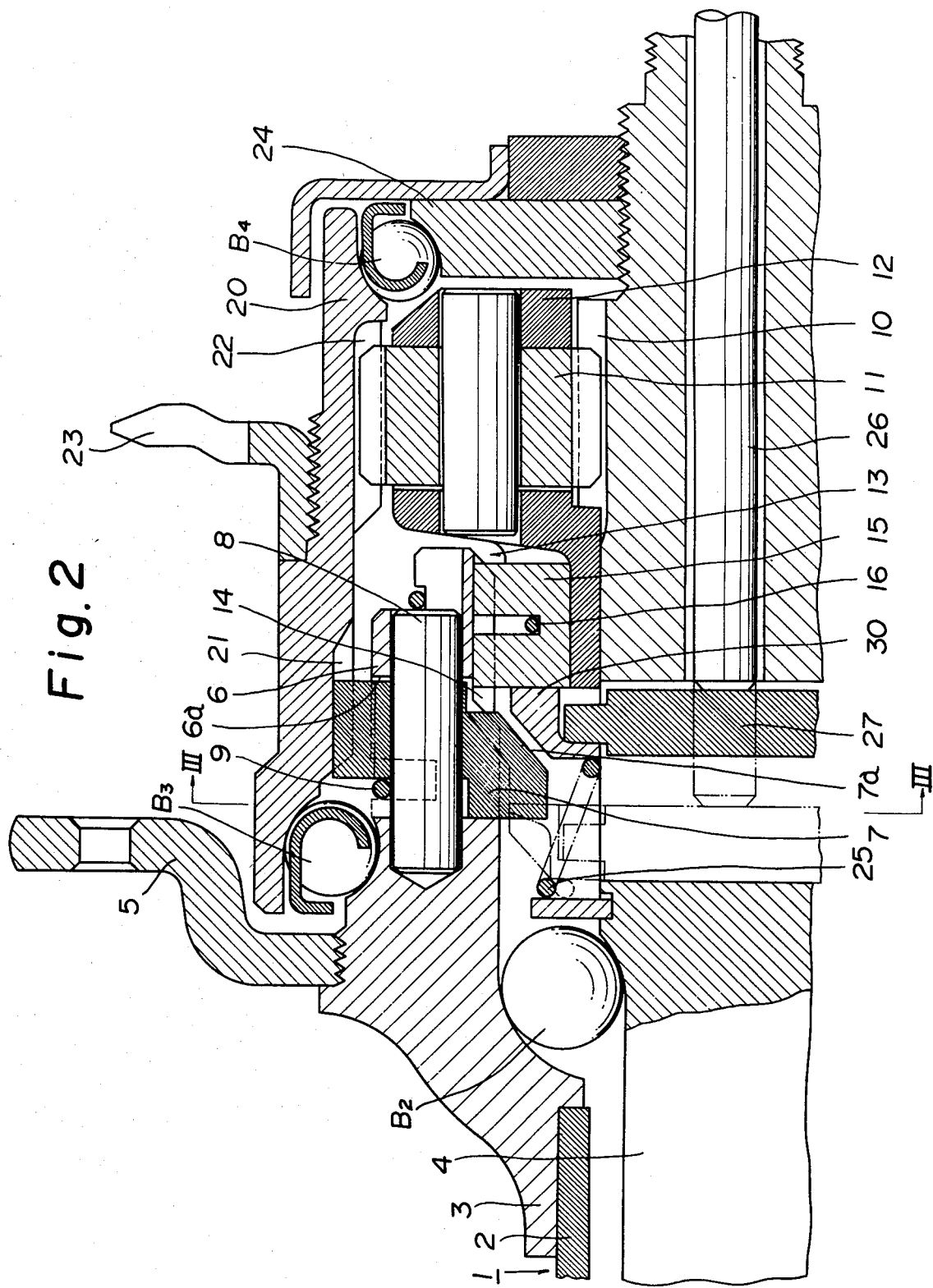
Figure 3:
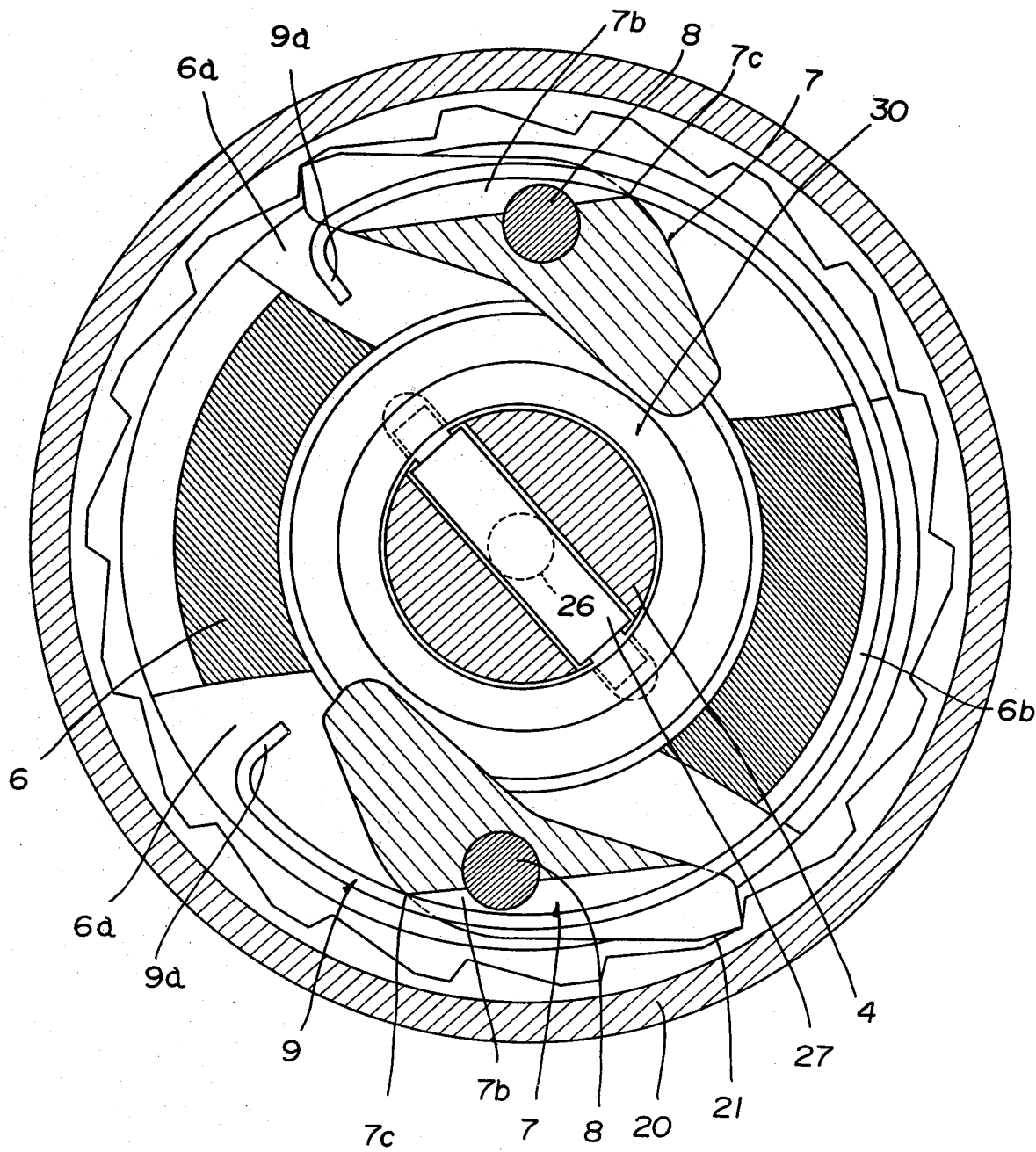

These and other objects and novel features of the invention will become apparent from the description of an embodiment thereof in accordance with the accompanying drawings, in which:

FIG. 1 is a partially cutaway front view of an embodiment of hub of the invention, FIG. 2 is an enlarged sectional view of the principal portion of the hub in FIG. 1, and FIG. 3 is a sectional view taken on Line III—III in FIG. 2.

Referring to the drawings, reference numeral 1 designates a hub body. The hub body 1 comprises a hub shell 2 made from 9 pipe and a pair of hub end portions 3 having hub flanges 5 provided at both axial ends of the hub shell 2.

Reference numeral 4 designates a hub shaft fixed to the bicycle frame. Onto the hub shaft 4 is rotatably supported the hub body 1 through a pair of ball bearings $B_1$ and $B_2$.

In the hub constructed as described, one of the hub end portions 3 is extended axially outwardly of the hub flange 5 to form a cylindrical extension 6 which carries at its lengthwise intermediate portion freely rising and falling first transmitting pawls 7.

In detail, at the lengthwise intermediate portion of cylindrical extension 6 are provided two through holes 6a shifted at a phase angle of 180°. The transmitting pawls 7 are inserted into the through holes 6a, pivotally supported to the extension 6 by pivots 8, and biased by a pawl spring 9 respectively so that the tip of each pawl 7 always tends to mesh with ratchet teeth 21 at a driving member 20 to be hereinafter described. The transmitting pawls 7, when meshing with the ratchet teeth, project at the tails radially inwardly from the inner surface of cylindrical extension 6, and are provided at the tails with inclined surfaces 7a for contacting with a control member 30 to be hereinafter described. The control member 30 is operated to contact with the inclined surfaces 7a to swing the transmitting pawls 7, thereby enabling the tips of pawls 7 to disengage from the ratchet teeth 21.

The pawl spring 9 may comprise coiled springs, which are each wound onto the pivots 8 and seated at one end to the transmitting pawl 7 and at the other end to the cylindrical extension 6. But it is preferable that a single pawl-spring 9, as shown in FIGS. 2 and 3, having a C-like shape and inwardly bent ends 9a, be used so that the bent ends 9a may be fit into the through holes 6a at the cylindrical extension 6 respectively.

In this instance, at the outer periphery of cylindrical extension 6 is provided an annular groove 6b communicating with the through holes 6a, and the transmitting pawls 7 are provided with grooves 7b receiving therein the C-like shaped pawl spring 9, so that the spring 9 is inserted into the annular groove 6b and receiving groove 7b, and abuts against contact jaws 7c at the grooves 7b of pawls 9, whereby the tips of pawl 7 are biased by the spring 9 to mesh with the ratchet teeth 21 respectively.

Accordingly, a single C-like shaped pawl-spring 9 can be used permitting a simple assembly which is easily maintained because of less failure in comparison with the aforesaid coiled springs.

The hub shaft 4, which is positioned axially outwardly of the cylindrical extension 6, is provided with a sun gear 10. A gear frame 12 having planetary pinions 11 in mesh with the sun gear 10 is rotatably supported to the hub shaft 4 and arranged axially outwardly of and axially in series with the cylindrical extension 6. A unidirectionally rotary transmission mechanism 13 is provided between the cylindrical extension 6 and the gear frame 12.

The unidirectionally rotary transmission mechanism 13 comprises ratchet teeth 14 provided a circumferentially of the inner periphery at the axial end of cylindrical extension 6 and second transmitting pawls 15 provided at the gear frame 12. The second transmitting pawls 15 are biased by spring means 16 to always mesh with the ratchet teeth 14. Hence, when the gear frame 12 rotates in one direction, the driving force is transmitted from the gear frame 12 to the cylindrical extension 6 and hub shell 2 by way of the transmission mechanism 13. On the other hand, when the gear frame 12 rotates in the reverse direction, the second transmitting pawls 15 are not in mesh with the ratchet teeth 14 but ride thereover, whereby the transmission mechanism 13 transmits no driving force from the gear frame 12 to the cylindrical extension 6.

The driving member 20 is cylindrical to cover the outer peripheries of the cylindrical extension 6 and gear frame 12, and is provided at the inner periphery of an axially inside portion with ratchet teeth 21 in mesh with the first transmitting pawls 7 and at the inner periphery of an axially outside portion with inner teeth 22 in mesh with the planetary pinions 11 and at the outer periphery with at least one sprocket 23. The driving member 20 also is supported rotatably with respect to the hub shaft 4 through a first and a second bearing means $B_3$ and $B_4$ of a pair of ball bearings.

The first bearing means $B_3$ is provided at the outer periphery of cylindrical extension 6 and supports the driving member 20 at the axially inside portion thereof. The second bearing means $B_4$ is provided at the outer periphery of a support 24 screwed with the hub shaft 4 and supports the driving member 20 at the axially outside portion thereof.

The control member 30 serves to control the first transmitting pawls 7, engaging them with or disengaging them from the ratchet teeth 21. The control member 30 is supported so as to be only axially movable with respect to the hub shaft 4 and is normally biased against the end face of gear frame 12 by way of spring means 25 which is seated at one end thereof, to the hub shaft 4. Control member 30 is movable axially of hub shaft 4 by the force of spring 25 and the axial movement of a speed-change rod 26 inserted into the central hollow of hub shaft 4 from axial outside thereof. A speed-change key 27 contacts with the speed-change rod 26 and engages at both lengthwise ends with the control member 30.

The control member 30 is disposed at the axial inside (leftwardly in FIG. 2) of gear frame 12 and at the radial inside of cylindrical extension 6, and transmits no driving force, thereby being lightly controllable under a no-load condition without being subjected to the driving force regardless of any transmitting route therefor.

The above construction is applied to a two stage transmission of low and high speed, in which the speed-change rod 26 is operated to move the control member 30 axially of the hub shaft 4.

Referring to FIGS. 2 and 3, the high speed drive condition is shown, in which the control member 30 is separated from the inclined surfaces 7a at the first transmitting pawls 7, the latter of which are in mesh with the ratchet teeth 21 at the driving member 20.

Hence, the driving force from the sprocket 23 is transmitted from the driving member 20 directly to the cylindrical extension 6 by way of the first transmitting pawls 7 so that the hub body 1 is rotated at a transmission ratio of 1 to 1 with respect to the driving member 20.

At this time, the gear frame 12 also rotates, but at lower speed than the cylindrical extension 6, thereby allowing the second transmitting pawls 15 to be idle, resulting in free rotation of the cylindrical extension 6 with respect to the gear frame 12.

When the speed is changed from this high speed stage to the low speed stage, the speed-change rod 26 is moved leftward in FIG. 2 to move the control member 30 leftward against the force of spring means 25 through the speed-change key 27, so that the control member 30 urges the first transmitting pawls 7 by way of inclined surfaces 7a thereof to disengage from the ratchet teeth 21.

Hence, the driving force from the sprocket 23 is transmitted to the planetary pinions 11 through the inner teeth 22 at the driving member 20, thereby rotating the gear frame 12 at the reduced rotating speed. The rotating force from the gear frame 12 is transmitted to the cylindrical extension 6 through the second transmitting pawls 15, thereby rotating the hub body 1 at low speed.

Although the described unidirectional rotary transmission mechanism is provided between the inner periphery at the axial end of cylindrical extension 6 and the outer periphery of gear frame 12, it may alternatively be provided between the foremost end face of cylindrical extension 6 and the end face of gear frame 12 opposite thereto.

As clearly understood from the aforesaid description, the two stage transmission hub of the invention is constructed such that one hub end portion is extended axially outwardly of the hub flange to form the cylindrical extension, the first transmitting pawls are provided thereat, the sun gear is provided at the hub shaft positioned axially outwardly of the cylindrical extension, the gear frame having planetary pinions in mesh with the sun gear is rotatably supported to the hub shaft, the cylindrical extension and gear frame are arranged axially in series to each other, and the unidirectionally rotary transmission mechanism is provided between the cylindrical extension and the gear frame, thereby sufficiently reducing the diameter of driving member to make the hub light in weight.

Also, no parts, except for the planetary pinions, are interposed between the inner teeth of driving member and the sun gear, whereby the planetary pinions, even though the driving member is smaller in diameter, are made larger enough in diameter to ensure stable engagement with the inner teeth. When the number of teeth at the inner teeth, planetary gears, and sun gear are expressed by R, P and S respectively, the transmission ratio A is defined by the formula: $A = R/(R+S)$, where $R = 2P + S$. Hence, the small diameter driving member and the small number of inner teeth make it possible to increase the transmission ratio.

Furthermore, since the control member is not subjected to the driving force from the driving member, the speed change is considerably facilitated.

As is readily understood by those skilled in the art, the above description is of a preferred embodiment of the disclosed invention to which various changes and modifications may be made without departing from the spirit and scope thereof.

What is claimed is:

1. A two stage transmission hub for a bicycle, comprising;

(a) a hub shaft;

(b) a hub body rotatably supported to said hub shaft, said hub body being provided at both axial ends thereof with hub end portions having flanges respectively, one of said hub end portions having a cylindrical extension extending axially outwardly of one of said flanges, said cylindrical extension supporting at a substantially intermediate portion thereof freely rising and falling transmitting pawls;

(c) a sun gear provided at the outer periphery of said hub shaft at a position axially outwardly of said cylindrical extension;

(d) a gear frame having planetary pinions in mesh with said sun gear, said gear frame being supported rotatably to said hub shaft and being positioned axially outwardly of said cylindrical extension and arranged axially in series thereto;

(e) a unidirectional rotary transmission mechanism for transmitting one-directional rotation of said gear frame to said cylindrical extension;

(f) a cylindrical driving member covering the outer peripheries of said cylindrical extension and gear frame, said driving member being provided at the inner periphery of an axially inside portion thereof with ratchet teeth in mesh with said transmitting pawls, at the inner periphery of an axially outside portion thereof with inner teeth in mesh with said planetary pinions, and at the outer periphery thereof with at least one sprocket;

(g) a pair of first and second bearing means for rotatably supporting said driving member, said first bearing means being provided on said cylindrical extension, said second bearing means being provided on said hub shaft; and (h) a control member for controlling said transmitting pawls to cause their engagement with and disengagement from said ratchet teeth, said control member being supported to said hub shaft so as to be axially movable.

2. A two-stage transmission hub for a bicycle according to claim 1, wherein said control member includes an operating means for axially moving said control member, said control member being independent of the drivng force transmitting route of said cylindrical extension and gear frame and being supported to said hub shaft so as to be only axially movable.

3. A two-stage transmission hub for a bicycle according to claim 1, wherein said transmitting pawls are supported to said cylindrical extension so as to be swingable around respective pivots mounted in parallel to said hub shaft, and said transmitting pawls are biased by a pawl spring such that the tips of said transmitting pawls are in engagement with said ratchet teeth at said driving member, so that when the tips of said transmitting pawls mesh with said ratchet teeth, the tails of said transmitting pawls are adapted to project radially inwardly of said cylindrical extension, said control member being moved to contact with the tails of said transmitting pawls, thereby allowing said transmitting pawls to swing to disengage the tips thereof from said ratchet teeth.

4. A two-stage transmission hub for a bicycle according to claim 3, wherein said cylindrical extension is provided with at least two pawl-receiving through holes, said through holes receiving therein said transmitting pawls, said transmitting pawls being pivotally supported through said pivots respectively, said pawl spring being formed in a C-like shape and being provided at its two free ends with projections directed inwardly, said projections entering said through holes.

* * * * *